US008073050B2

(12) United States Patent
Suzuki et al.

(10) Patent No.: US 8,073,050 B2
(45) Date of Patent: Dec. 6, 2011

(54) ENCODING DEVICE AND ENCODING METHOD

(75) Inventors: Masanao Suzuki, Kawasaki (JP); Miyuki Shirakawa, Fukuoka (JP); Yoshiteru Tsuchinaga, Fukuoka (JP); Takashi Makiuchi, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 876 days.

(21) Appl. No.: 12/068,833

(22) Filed: Feb. 12, 2008

(65) Prior Publication Data

US 2008/0219344 A1 Sep. 11, 2008

(30) Foreign Application Priority Data

Mar. 9, 2007 (JP) ................................ 2007-060933

(51) Int. Cl.
*H04N 7/12* (2006.01)

(52) U.S. Cl. .............................. 375/240.01; 375/240.26

(58) Field of Classification Search ........................ None
See application file for complete search history.

(56) References Cited

U.S. PATENT DOCUMENTS 5,684,922 A * 11/1997 Miyakawa et al. ........... 704/229
6,097,759 A * 8/2000 Murakami et al. ............ 375/240
7,246,065 B2 * 7/2007 Tanaka et al. ................ 704/500
7,492,701 B2 * 2/2009 Song et al. .................... 370/208
2003/0142746 A1 * 7/2003 Tanaka et al. ........... 375/240.11
2004/0019492 A1 1/2004 Tucker et al.
2005/0014933 A1 1/2005 Peters et al.
2005/0267744 A1 12/2005 Nettre et al.
2006/0074642 A1 * 4/2006 You .............................. 704/222
2006/0256971 A1 11/2006 Chong et al.

FOREIGN PATENT DOCUMENTS

JP 2001525079 12/2001

(Continued)

OTHER PUBLICATIONS

Nilsson M. et al., "Avoiding over-estimation in bandwidth extension of telephony speech" 2001 IEEE International Conference on Acoustics, Speech, and Signal Processing. Proceedings. (ICASSP). Salt Lake City, UT; May 7-11, 2001; vol. 2, pp. 869-872; XP010803743.

(Continued)

*Primary Examiner* — Hong Cho
(74) *Attorney, Agent, or Firm* — Murphy & King, P.C.

(57) ABSTRACT

When creating SBR data in a the low-resolution mode, an encoding device divides a high-frequency component of input audio data being encoded by SBR method into a high-frequency band and a low-frequency band, and calculates an average high-frequency power value that indicates the average value of the power in the high-frequency band of the audio data, as well as an average low-frequency power value that indicates the average value of the power in the low-frequency band of the audio data. The encoding device then compares the average high-frequency power value and the average low-frequency power value, selecting the smaller of the two. The encoding device then corrects the power of the high-frequency component of the signal being encoded by the SBR method so that it equals the selected average power value.

10 Claims, 7 Drawing Sheets

FOREIGN PATENT DOCUMENTS

| | | | |
|---|---|---|---|
| JP | 2003529787 | | 10/2003 |
| JP | 2005-520219 | | 7/2005 |
| JP | 2005-338637 | | 12/2005 |
| WO | 9852187 | A1 | 11/1998 |
| WO | 0126095 | A1 | 4/2001 |
| WO | 2004027368 | A1 | 4/2004 |
| WO | 2005036527 | A1 | 4/2005 |
| WO | WO 2006/075663 | | 7/2006 |

OTHER PUBLICATIONS

Extended European Search Report dated Jul. 4, 2008 issued in corresponding European Application No. 08002888.9-2225.

Japanese Notice of Rejection dated Jul. 26, 2011 for application No. 2007-060933.

* cited by examiner

LOW RESOLUTION MODE

HIGH RESOLUTION MODE

ENCODING DEVICE AND ENCODING METHOD

BACKGROUND OF THE INVENTION

1. Field of the Invention

The present invention relates to an encoding device and an encoding method that output an audio signal by multiplexing a first encoded data obtained by encoding a low-frequency component of the audio signal by a first encoding method and a second encoded data obtained by encoding a high-frequency component of the audio signal by a second encoding method. More particularly, the present invention relates to an encoding device and an encoding method that enable the high-frequency component of an audio signal to be appropriately encoded even when it is encoded in a low-resolution mode.

2. Description of the Related Art

Moving Picture Experts Group Phase 2 (MPEG-2) High-Efficiency Advanced Audio Coding (hereinafter, "HE-AAC") method is a widely used method for encoding audio data such as voice and music. In the HE-AAC method, a low-frequency component of audio signals is encoded by AAC and a high-frequency component is encoded by Spectral Band Replication (SBR).

FIG. 8 is a schematic for explaining the HE-AAC method. Data encoded by the SBR method includes position data indicating the position where the high-frequency component is to be replicated from the low-frequency component (which is encoded by the AAC method), parameters representing correction of power of the high-frequency component, and data pertaining to components that cannot be replicated from the low-frequency component. As compared to other encoding methods, the data volume can be compressed to a much greater extent by encoding using the HE-AAC method, which combines the low-frequency component and the high-frequency component when encoding is performed by the AAC method. The data encoded by the AAC method shall hereafter be referred to as AAC data, and the data encoded by the SBR method shall be referred to as SBR data.

A conventional encoding device that encodes input audio data by the HE-AAC method is described below. FIG. 9 is a functional block diagram of the conventional encoding device. An encoding device 10 includes an SBR encoder 11, a down-sampling unit 12, an AAC encoder 13, and a multiplexing unit 14.

The SBR encoder 11 encodes input audio data by the SBR method, and outputs the encoded SBR data to the multiplexing unit 14. Prior to encoding the audio data, the SBR encoder 11 determines, based on criteria laid down beforehand by an administrator, whether the audio data is to be encoded in a high-resolution mode or a low-resolution mode and encodes the audio data according to the result of the determination.

FIG. 10 is a schematic for explaining the high-resolution mode and the low-resolution mode. The upper part of FIG. 10 is a schematic for explaining the high-resolution mode. In the high-resolution mode, the frequency bands of the input audio data being encoded by the SBR method (hereinafter, "SBR encoding band") are divided into a plurality of blocks (for example, two blocks), and the power of each block is averaged out before the blocks are quantized and the SBR data created.

The lower part of FIG. 10 is a schematic for explaining the low-resolution mode. In the low-resolution mode, the power of the entire range of SBR encoded bands is averaged out and the block is quantized before SBR data is created. By encoding in the high-resolution mode, the high-frequency component of the audio data can be encoded accurately, and by encoding in the low-resolution mode, the data volume of high-frequency component can be reduced.

Returning to FIG. 9, the down-sampling unit 12 extracts the low-frequency component of the input audio data, and outputs the extracted low-frequency component to the AAC encoder 13. The AAC encoder 13 creates AAC data based on the low-frequency component received from the down-sampling unit 12, and outputs the AAC data to the multiplexing unit 14.

The multiplexing unit 14 multiplexes (combines) the SBR data output by the SBR encoder 11 and the AAC data output by the AAC encoder 13 and outputs the multiplexed data (HE-AAC bit stream). Thus, the conventional encoding device 10 encodes input audio data by the SBR encoder 11, the down-sampling unit 12, the AAC encoder 13, and the multiplexing unit 14.

A method is disclosed in Japanese Patent Application Laid-open No. 2005-338637 whereby the average power of every sub-band is compared before and after quantization, and if they are different, the scale factor (exponent) is adjusted so that the normalized power after quantization approximates the normalized power before quantization.

However, in the existing technologies, appropriate encoding of the high-frequency component is not realized when the high-frequency component of the input audio data is encoded in the low-resolution mode in order to reduce the data volume of the high-frequency components (the components of the input audio data in the SBR encoded bands).

The reason why the high-frequency component is not appropriately encoded is because, as shown in FIG. 10, if the entire high-frequency range is encoded in the low-resolution mode when the power at the high frequency end of the high-frequency component drops suddenly, the entire high-frequency component range is averaged, and the power at the high frequency end exceeds the power of the original audio data.

In other words, it is imperative to be able to appropriately encode the high-frequency component of the input audio data even when the high-frequency component is encoded in the low-resolution mode.

SUMMARY OF THE INVENTION

It is an object of the present invention to at least partially solve the problems in the conventional technology.

According to an aspect of the present invention, an encoding device creates first code data by encoding a low-frequency component of a signal by a first encoding method and second code data by encoding a high-frequency component of the signal by a second encoding method, and multiplexes the first code data and the second code data to output a multiplexed code data. The encoding device includes a calculating unit that divides the high-frequency component of the signal to be encoded by the second encoding method into a high-frequency band and a low-frequency band, and calculates a high-frequency power value that indicates a power value of the signal in the high-frequency band, and a low-frequency power value that indicates a power value of the signal in the low-frequency band; and a correcting unit that compares the high-frequency power value and the low-frequency power value, and corrects the power value of the high-frequency component of the signal to be encoded by the second encoding method based on a result of comparison.

According to another aspect of the present invention, an encoding method is used in an encoding device that creates first code data by encoding a low-frequency component of a signal by a first encoding method and second code data by encoding a high-frequency component of the signal by a second encoding method, and multiplexes the first code data and the second code data to output a multiplexed code data. The encoding method includes dividing the high-frequency component of the signal to be encoded by the second encoding method into a high-frequency band and a low-frequency band; calculating a high-frequency power value that indicates a power value of the signal in the high-frequency band, and a low-frequency power value that indicates a power value of the signal in the low-frequency band; comparing the high-frequency power value and the low-frequency power value; and correcting the power value of the high-frequency component of the signal to be encoded by the second encoding method based on a result of comparison.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the encoding device and the encoding method according to the present embodiment are described below with reference to the accompanying drawings.

Figure 1:
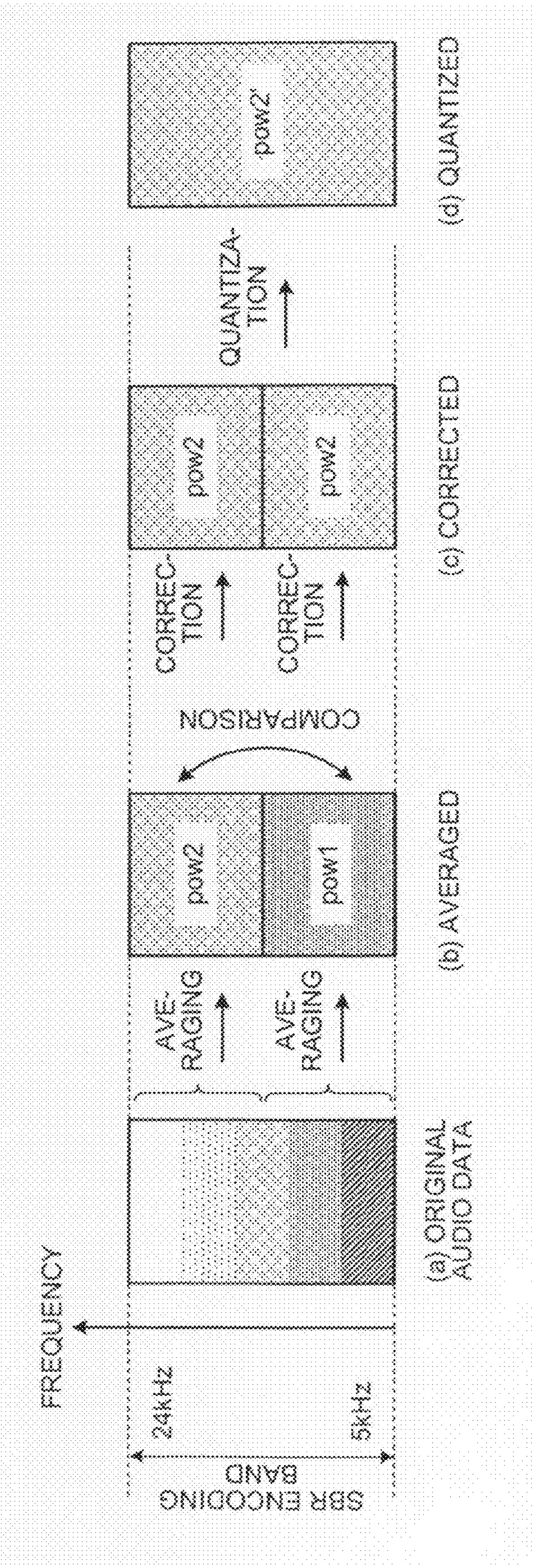
FIG. 1 is a schematic for explaining the salient feature of an encoding device according to a first embodiment of the present invention.

The salient feature of the encoding device according to a first embodiment of the present invention is described first. FIG. 1 is a schematic for explaining the salient feature of the encoding device according to the first embodiment. The encoding device according to the first embodiment first creates advanced audio coding (AAC) data by encoding low-frequency component of an input audio signal (voice or music) using an AAC encoding method, and spectral band replication (SBR) data by encoding high-frequency component of the input audio data using an SBR method, and then multiplexes the AAC data and the SBR data before outputting them. When creating the SBR data in the low-resolution mode (see Description of the Related Art), the encoding device divides the high-frequency component of the input audio data into a high-frequency band and a low-frequency band, as shown in FIG. 1, and calculates an average high-frequency power value of the audio data in the high-frequency band and an average low-frequency power value of the audio data in the low-frequency band.

The encoding device then compares the average high-frequency power value and the average low-frequency power value, and selects the smaller of the average high-frequency power value and the average low-frequency power value. The encoding device then corrects the power of the high-frequency component being encoded by the SBR method so that it equals the selected average power value.

In the example shown in FIG. 1, the average high-frequency power value is represented by "pow2" and the average low-frequency power value by "pow1". If the difference between the average high-frequency power value "pow2" and the average low-frequency power value "pow1" is greater than or equal to a threshold value, and in addition, the average high-frequency power value "pow2" is less than the average low-frequency power value "pow1", the encoding device corrects the power of the high-frequency component of the input audio data being encoded by the SBR method to "pow2". The encoding device then quantizes the high-frequency component of the corrected input audio data, and creates the SBR data.

Thus, when creating the SBR data in the low-resolution mode, the encoding device according to the first embodiment first compares the average high-frequency power value and the average low-frequency power value, and creates the SBR data by correcting the power of the input audio data to the smaller of the average high-frequency power value and the average low-frequency power value. Consequently, the high-frequency component of the input audio data can be appropriately encoded. In particular, in audio data such as voice data, unnatural emphasis on the consonant 's' can be prevented.

Figure 2:
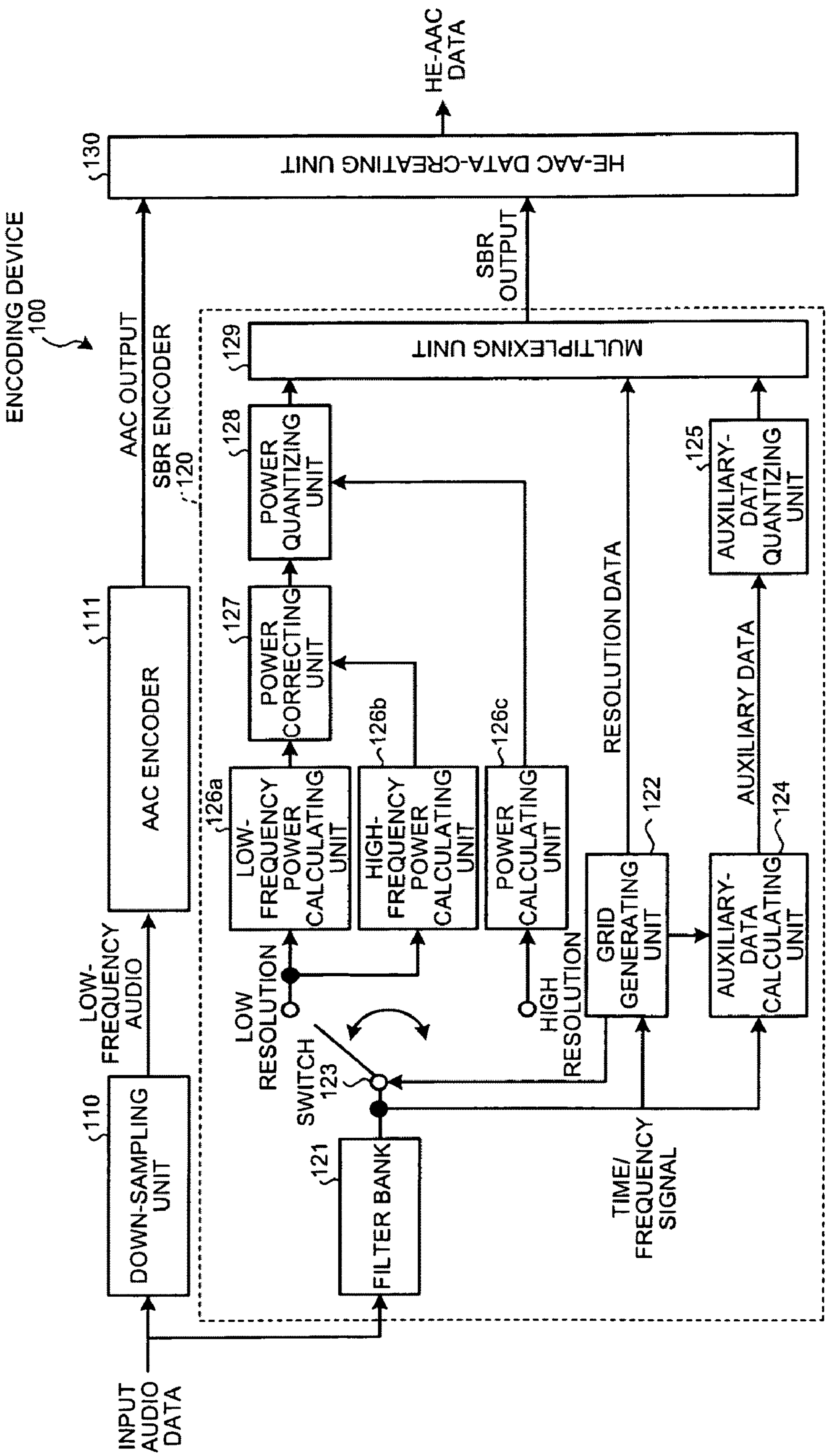
FIG. 2 is a functional block diagram of the encoding device according to the first embodiment.

A configuration of the encoding device according to the first embodiment is described below. FIG. 2 is a functional block diagram of the encoding device according to the first embodiment. An encoding device 100, as shown in FIG. 2, includes a down-sampling unit 110, an AAC encoder 111, an SBR encoder 120, and an HE-AAC data-creating unit 130.

The down-sampling unit 110 extracts the low-frequency component of an audio signal input from a not shown input device, and outputs the extracted low-frequency component (hereinafter, "low-frequency component data") to the AAC encoder 111. For example, if the frequency of the input audio signal is A Hz, the down-sampling unit 110 performs sampling at a sampling frequency of A/2 Hz to extract the low-frequency component of the audio signal.

The AAC encoder 111 encodes the low-frequency component data received from the down-sampling unit 110 by the AAC encoding method, creates the AAC data, and outputs the AAC data to the HE-AAC data-creating unit 130.

The SBR encoder 120 encodes the audio signal input from the not shown input device by the SBR method to create the SBR data and outputs the SBR data to the HE-AAC data-creating unit 130.

Figure 3:
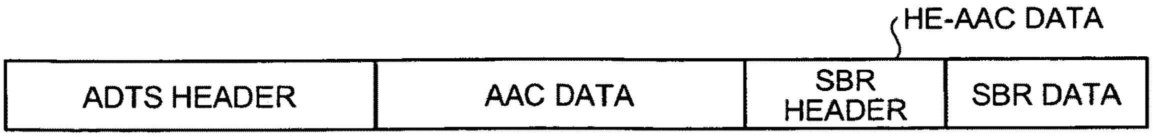
FIG. 3 is a schematic diagram of HE-AAC data.

The HE-AAC data-creating unit 130 creates HE-AAC data based on the AAC data received from the AAC encoder 111 and the SBR data received from the SBR encoder 120. FIG. 3 is a schematic diagram of the HE-AAC data. The HE-AAC data includes an ADTS header, AAC data, an SBR header that includes control data for the SBR data, and the SBR data.

A configuration of the SBR encoder 120 is described below. As shown in FIG. 2, the SBR encoder 120 includes a filter bank 121, a grid generating unit 122, a switch 123, an auxiliary-data calculating unit 124, an auxiliary-data quantizing unit 125, a low-frequency power calculating unit 126*a*, a high-frequency power calculating unit 126*b*, a power calculating unit 126*c*, a power correcting unit 127, a power quantizing unit 128, and a multiplexing unit 129.

Upon receiving audio data from the input device, the filter bank 121 analyzes the spectral attributes of the audio data that vary according to the frequency of the audio data and time, and converts the audio data into a time/frequency signal that indicates the relation between the frequency, time, and spectrum (power) of the input audio data. The filter bank 121 then outputs the time/frequency signal to the grid generating unit 122, the auxiliary-data calculating unit 124, and the low-frequency power calculating unit 126*a* and the high-frequency power calculating unit 126*b*, or the power calculating unit 126*c*, whichever is connected to the switch 123.

The grid generating unit 122 decides whether the SBR data is to be encoded in a high-resolution mode or the low-resolution mode based on the time/frequency signal received from the filter bank 121.

It is supposed that the administrator of the encoding device 100 presets the criteria based on which the grid generating unit 122 decides whether to encode the SBR data in the high-resolution mode or low-resolution mode. For example, the grid generating unit 122 can be set to decide to encode the SBR data in the high-resolution mode if the difference between the maximum power value and the minimum power value of the time/frequency signal is greater than a reference value (that is, if the variation in the power due to change in the frequency/time is extreme), and in the low-resolution mode if the difference between the maximum power value and the minimum power value of the time/frequency signal is within the reference value (that is, if the variation in the power due to change in the frequency/time is mild).

The grid generating unit 122 outputs the result of the decision (that is, data indicating whether encoding is to be performed in a high-resolution mode or the low-resolution mode, hereinafter, "resolution data") to the auxiliary-data calculating unit 124, and switches the switch 123 according to the result of the decision.

In other words, if the result of the decision indicates that the SBR data is to be encoded in the low-resolution mode, the grid generating unit 122 changes the position of the switch 123 so that the filter bank 121 and the low-frequency power calculating unit 126*a* and the high-frequency power calculating unit 126*b* are connected (in FIG. 2, the grid generating unit 122 changes the switch 123 to up position).

If the result of the decision indicates that the SBR data is to be encoded in the high-resolution mode, the grid generating unit 122 changes the position of the switch so that the filter bank 121 and the power calculating unit 126*c* are connected (in FIG. 2, the grid generating unit 122 changes the switch 123 to down position).

The auxiliary-data calculating unit 124 receives the time/frequency signal from the filter bank 121, and the resolution data from the grid generating unit 122, and creates auxiliary data based on the time/frequency signal and the resolution data. The auxiliary data includes position data of the high-frequency component, parameters required for adjusting the power quantized by the power quantizing unit 128. The auxiliary-data calculating unit 124 outputs the auxiliary data to the auxiliary-data quantizing unit 125.

The auxiliary-data quantizing unit 125 quantizes the auxiliary data received from the auxiliary-data calculating unit 124, and outputs the quantized auxiliary data to the multiplexing unit 129.

The process performed by the SBR encoder 120 if the low-resolution mode is selected by the grid generating unit 122 is described below. If the low-resolution mode is selected by the grid generating unit 122, the filter bank 121 outputs the time/frequency signal to the low-frequency power calculating unit 126*a* and the high-frequency power calculating unit 126*b* via the switch 123.

Figure 4:
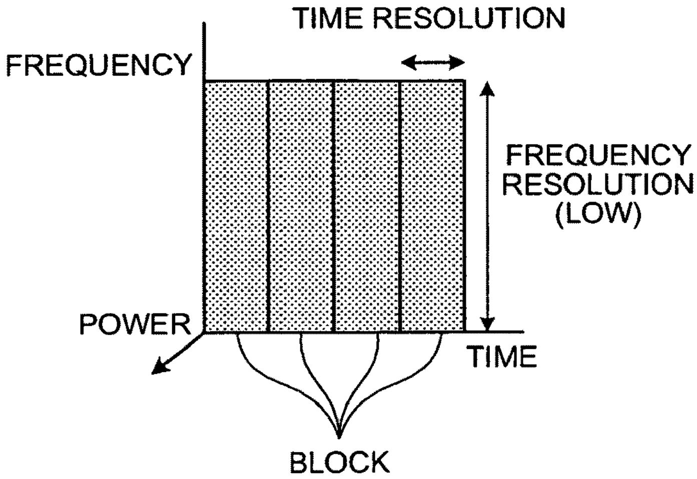
FIG. 4 is a schematic representation of time resolution and frequency resolution in a low-resolution mode.

FIG. 4 is a schematic representation of time resolution and frequency resolution in the low-resolution mode. In the low-resolution mode, the frequency resolution is lowered (in FIG. 4, the time/frequency signal is not divided along the frequency axis), and blocks of predetermined durations are created by dividing the time/frequency signal along the time axis.

After the time/frequency signal is divided into blocks, the low-frequency power calculating unit 126*a* calculates for each of the blocks shown in FIG. 4 an average power for the low frequencies (ranging from 5 kHz to 10 kHz) (hereinafter, "low-frequency power P_low") from among the frequency bands being encoded by the SBR method (hereinafter, "SBR encoding band"), and outputs the calculated low-frequency power P_low to the power correcting unit 127.

After the time/frequency signal is divided into blocks, the low-frequency power calculating unit 126*a* calculates for each of the blocks shown in FIG. 4 an average power for the high frequencies (ranging from 10 kHz to 15 kHz) (hereinafter, "high pass power P_high") from among the frequencies in the frequency band being encoded by the SBR method (hereinafter, "SBR encoding band"), and outputs the calculated high-frequency power P_high to the power correcting unit 127.

The power correcting unit 127 compares the low-frequency power P_low and the high-frequency power P_high, regards the smaller of the two as an average power P_ave of the SBR encoding band, and outputs the average power P_ave to the power quantizing unit 128. In other words, the power correcting unit 127 regards the low-frequency power P_low as the average power P_ave if the low-frequency power P_low is less than the high-frequency power P_high, the high-frequency power P_high as the average power P_ave if the high-frequency power P_high is less than the low-frequency power P_low, and the low-frequency power P_low (high-frequency power P_high) as the average power P_ave if the low-frequency power P_low is equal to the high-frequency power P_high.

The power quantizing unit 128 quantizes the average power P_ave received from the power correcting unit 127 or the power calculating unit 126*c*, and outputs the quantized average power P_ave to the multiplexing unit 129.

The process performed by the SBR encoder 120 if the high-resolution mode is selected by the grid generating unit 122 is described below. If the high-resolution mode is selected by the grid generating unit 122, the filter bank 121 outputs the time/frequency signal to the power calculating unit 126*c* via the switch 123.

Figure 5:
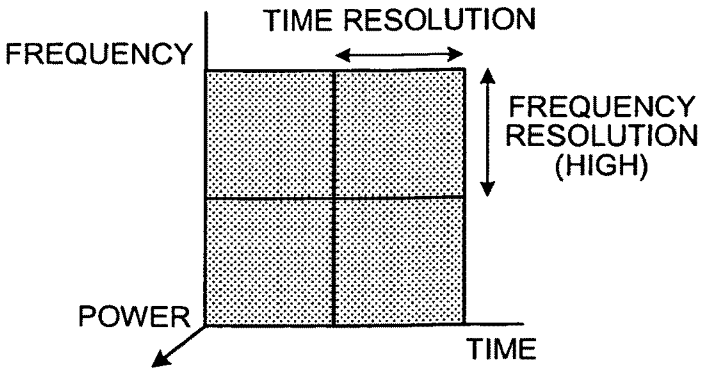
FIG. 5 is a schematic representation of time resolution and frequency resolution in a high-resolution mode.

FIG. 5 is a schematic representation of time resolution and frequency resolution in the high-resolution mode. In the high-resolution mode, the frequency resolution is increased (in FIG. 5, the time/frequency signal is divided along the frequency axis), and blocks of predetermined durations are created by dividing the time/frequency signal along the time axis.

The power calculating unit 126*c* calculates the average power P_ave for each of the blocks shown in FIG. 5, and outputs the calculated average power P_ave to the power quantizing unit 128. In the high-resolution mode, the average power P_ave is calculated as in the conventional method, and the power is not corrected.

The multiplexing unit 129 creates the SBR data by combining the average power P_ave received from the power quantizing unit 128, the resolution data received from the grid generating unit 122, and the auxiliary data received from the auxiliary-data quantizing unit 125, and outputs the SBR data to the HE-AAC data-creating unit 130.

Figure 6:
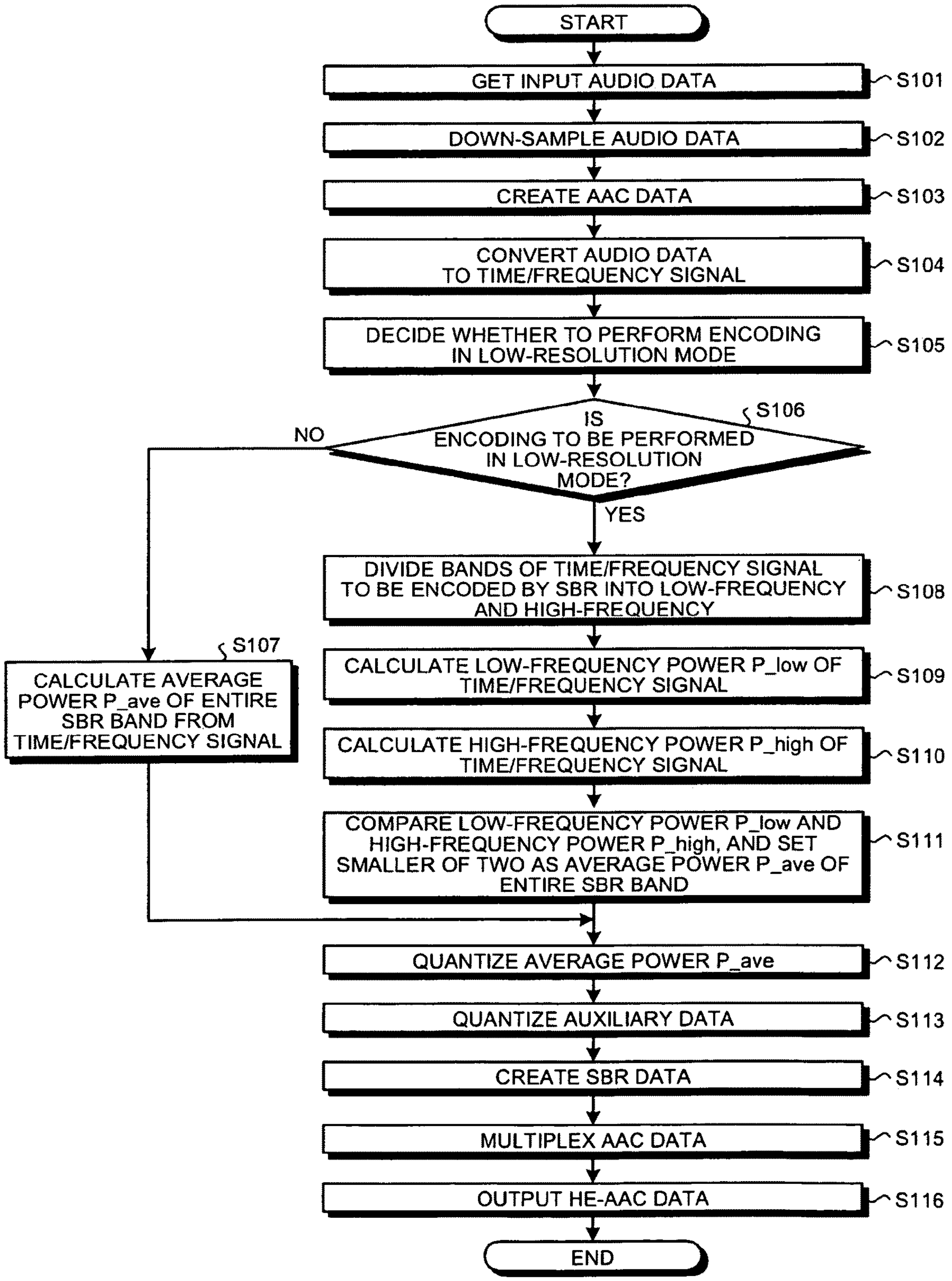
FIG. 6 is a flowchart of processes performed by the encoding device according to the first embodiment.

The process procedure of the encoding device 100 according to the first embodiment is described next. FIG. 6 is a flowchart of the processes performed by the encoding device 100 according to the first embodiment. Upon receiving the audio data from the input device (step S101), the down-sampling unit 110 of the encoding device 100 performs down sampling on the audio data and creates the low-frequency component data (step S102), and the AAC encoder 111 creates the AAC data from the low-frequency component data (step S103).

The filter bank 121 converts the audio data to time/frequency signal (step S104). The grid generating unit 122 decides whether encoding is to be performed in the low-resolution mode, and outputs the resolution data to the multiplexing unit 129 (step S105). If encoding is to be performed in high resolution (high-resolution mode) (No at step S106), the power calculating unit 126*c* calculates the average power P_ave of the entire SBR band from the time/frequency signal (step S107), and proceeds to step S112 described later.

If encoding is to be performed in low resolution (low-resolution mode) (Yes at step S106), the grid generating unit 122 divides the time/frequency signal into low-frequency bands and high-frequency bands (step S108). The low-frequency power calculating unit 126*a* calculates the low-frequency power P_low of the time/frequency signal (step S109), and the high-frequency power calculating unit 126*b* calculates the high-frequency power P_high of the time/frequency signal (step S110).

The power correcting unit 127 compares the low-frequency power P_low and the high-frequency power P_high, and sets the smaller of the two as the average power P_ave (step S111). The power quantizing unit 128 quantizes the average power P_ave received from the power correcting unit 127 or the power calculating unit 126*c*, and outputs the quantized average power P_ave to the multiplexing unit 129 (step S112).

The auxiliary-data calculating unit 124 creates and outputs the auxiliary data to the auxiliary-data quantizing unit 125. The auxiliary-data quantizing unit 125 quantizes the auxiliary data and outputs the quantized auxiliary data to the multiplexing unit 129 (step S113). The multiplexing unit 129 creates the SBR data from the average power P_ave data and the auxiliary data (step S114).

The HE-AAC data-creating unit 130 multiplexes the AAC data and the SBR data and creates the HE-AAC data (step S115), and outputs the HE-AAC data (step S116).

Thus, by comparing the low-frequency power P_low and the high-frequency power P_high, and setting the smaller of the two as the average power P_ave by the power correcting unit 127, unnatural emphasis in the high-frequency component of the audio data can be eliminated.

Thus, when encoding the SBR data in the low-resolution mode, the encoding device 100 according to the first embodiment divides the high-frequency component of the audio data into high-frequency band and low frequency band, and calculates the average high-frequency power value that indicates the average value of the power in the high-frequency band of the audio data as well as the average low-frequency power value that indicates the average value of the power in the low-frequency band of the audio data. The encoding device 100 then compares the average high-frequency power value and the average low-frequency power value, selecting the smaller of the two. The encoding device 100 then corrects the power of the high-frequency component of the signal being encoded by SBR encoding so that it equals the selected average power value. Consequently, in audio data such as voice data, unnatural emphasis on the consonant 's' can be prevented.

The power correcting unit 127 of the encoding device 100 according to the first embodiment compares the low-frequency power P_low and the high-frequency power P_high, and sets the smaller of the two as the average power P_ave of the entire SBR band. However, the power correcting unit 127 can be configured to set as the average power P_ave the value obtained by attenuating the high-frequency power P_high by a predetermined percentage (for example, 90%), or alternatively, the value obtained by amplifying the low-frequency power P_low by a predetermined percentage (for example, 90%).

The present invention allows various modifications. A second embodiment of the present invention is described below.

Figure 7:
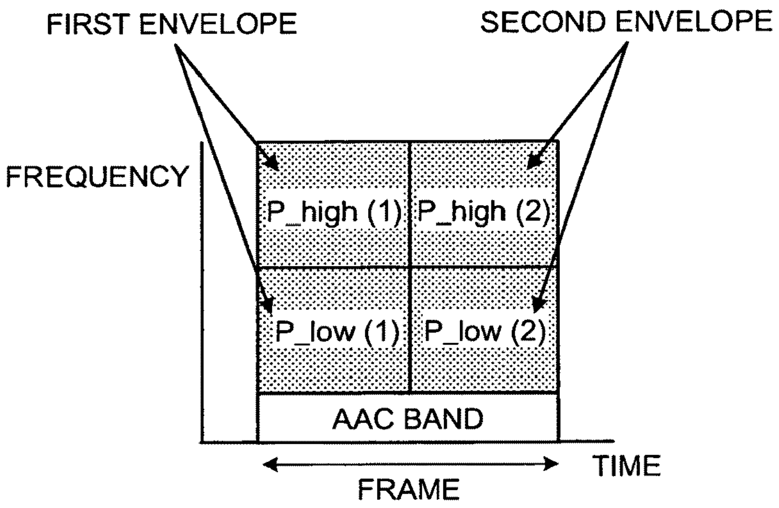
FIG. 7 is a schematic representation of a frame containing two envelopes.
Figure 8:
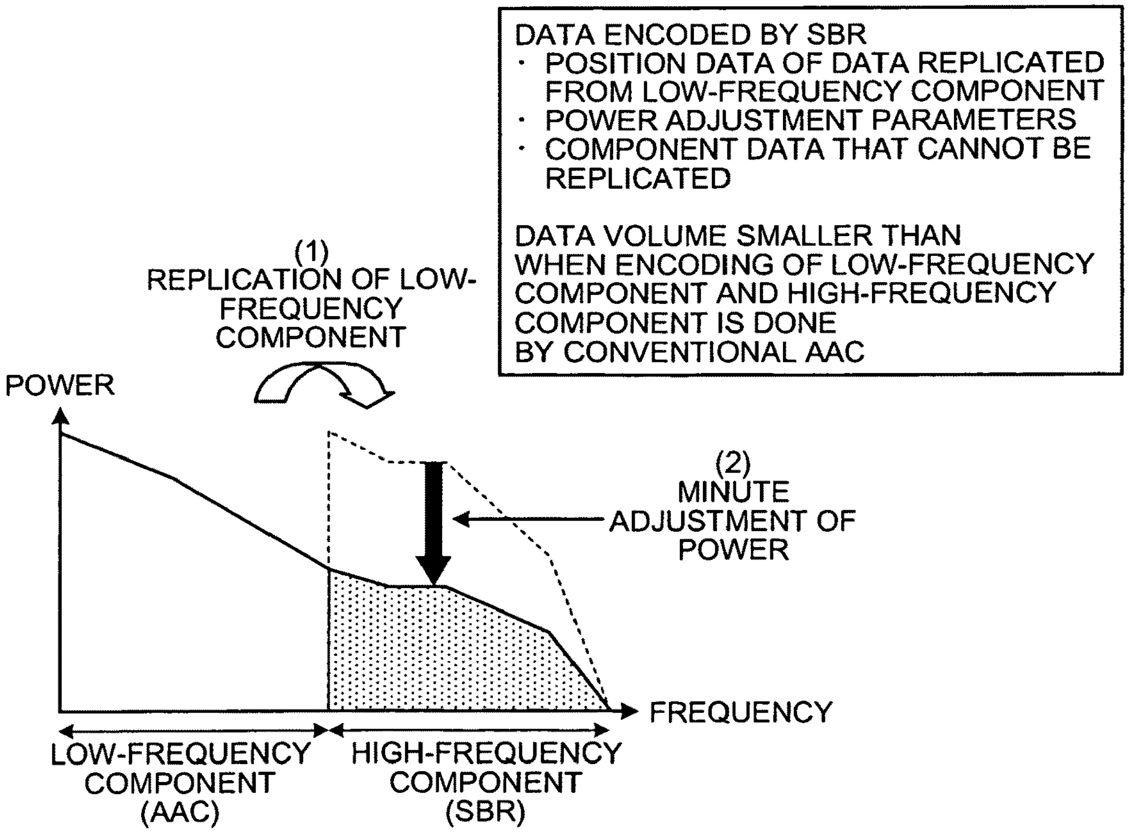
FIG. 8 is a schematic for explaining an HE-AAC method.
Figure 9:
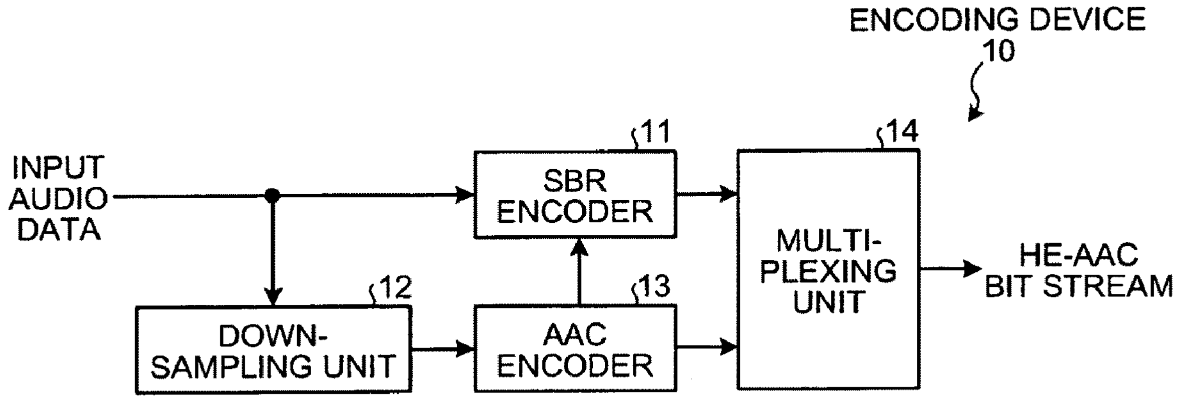
FIG. 9 is a functional block diagram of a conventional encoding device.
Figure 10:
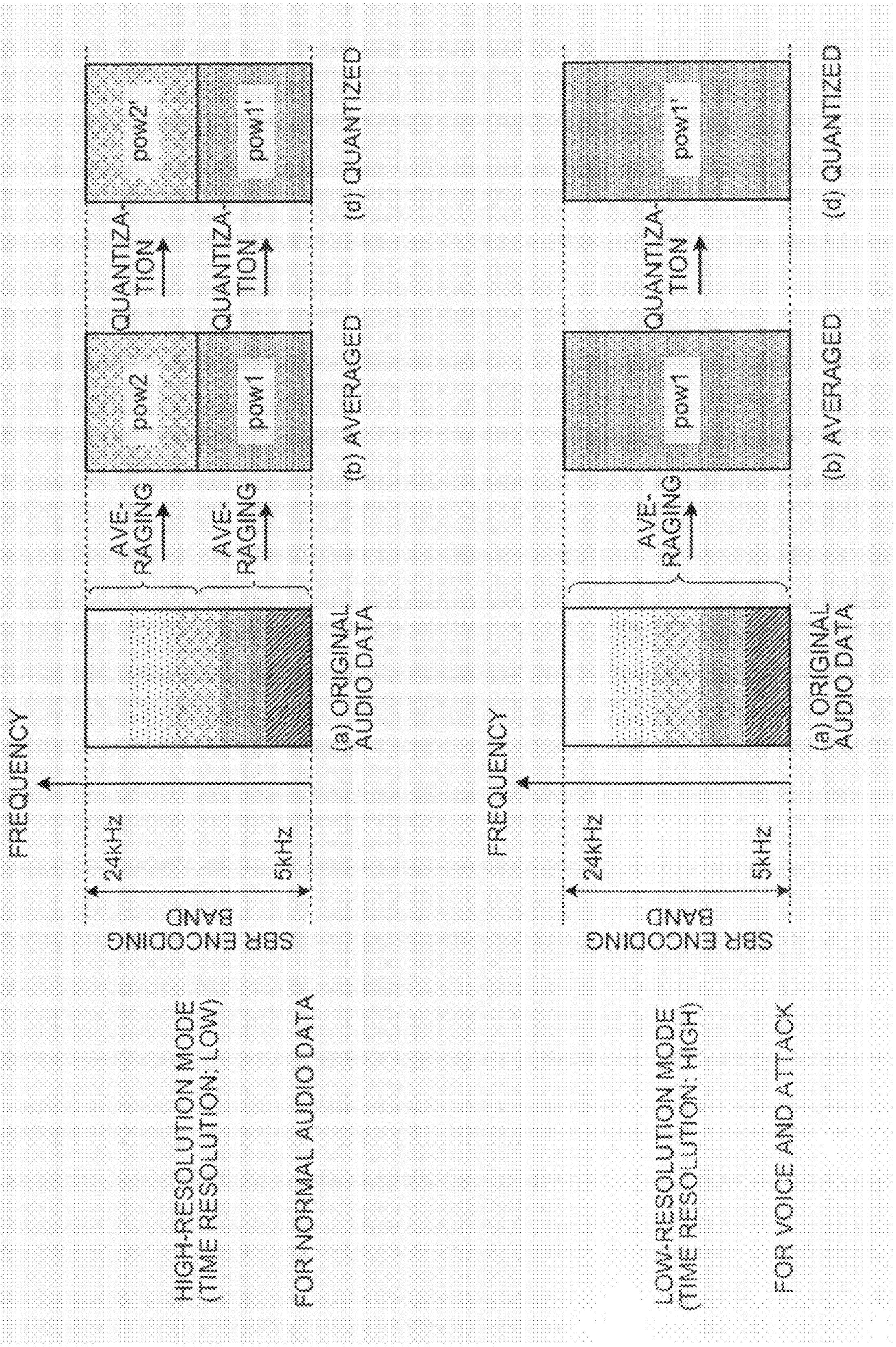
FIG. 10 is a schematic for explaining the high-resolution mode and the low-resolution mode.

In the SBR method, one pair or a plurality of pairs of power values may be determined when determining the power values of one frame in the low-resolution mode. One pair of power values is called an envelope (in the first embodiment, one frame contains one envelope). The method described in the first embodiment can be applied to perform optimized encoding of the SBR encoding band in the low-resolution mode even if a frame contains a plurality of envelopes. The configuration of the encoding device according to the second embodiment is identical to that of the first embodiment with only the process performed by the power correcting unit 127 differing from the first embodiment. Hence, only the process performed by the power correcting unit 127 is described here. FIG. 7 is a schematic representation of a frame containing two envelopes.

The low-frequency power and the high-frequency power of the first envelope are denoted respectively by P_low(1) and P_high(1), and those of the second envelope are denoted respectively by P_low(2) and P_high(2). In the low-resolution mode, the power correcting unit 127 performs power correction for every envelope (in the high-resolution mode, like the first embodiment, no power correction is performed even if one frame contains a plurality of envelopes).

For the first envelope, the power correcting unit 127 regards the low-frequency power P_low(1) as an average power P_ave(1) if the low-frequency power P_low(1) is less than the high-frequency power P_high(1), the high-frequency power P_high(1) as the average power P_ave(1) if the high-frequency power P_high(1) is less than the low-frequency power P_low(1), and the low-frequency power P_low(1) (high-frequency power P_high(1)) as the average power P_ave(1) if the low-frequency power P_low(1) is equal to the high-frequency power P_high(1).

For the second envelope, the power correcting unit 127 regards the low-frequency power P_low(2) as the average power P_ave(2) if the low-frequency power P_low(2) is less than the high-frequency power P_high(2), the high-frequency power P_high(2) as the average power P_ave(2) if the high-frequency power P_high(2) is less than the low-frequency power P_low(2), and the low-frequency power P_low(2) (high-frequency power P_high(2)) as the average power P_ave(2) if the low-frequency power P_low(2) is equal to the high-frequency power P_high(2).

The power correcting unit 127 then outputs the average power P_ave(1) of the first envelope and the average power P_ave(2) of the second envelope to the power quantizing unit 128.

Thus, in the encoding device according to the second embodiment, even if one frame contains a plurality of envelopes, the power correcting unit 127 compares the high-frequency power and low-frequency power to determine the average power of each envelope. Consequently, optimized encoding of the high-frequency component of the audio data can be performed.

One frame contains two envelopes in the second embodiment. However, one frame can contain more than two envelopes. The power of each of the envelopes can be corrected by the method described above to perform optimized encoding of the high-frequency component of the audio data.

Although the invention has been described with respect to specific embodiments for a complete and clear disclosure, the appended claims are not to be thus limited but are to be construed as embodying all modifications and alternative constructions that may occur to one skilled in the art which fairly fall within the basic teaching herein set forth.

All the automatic processes explained in the embodiments can be, entirely or in part, carried out manually by a known method. Similarly, all the manual processes explained in the embodiments can be, entirely or in part, carried out automatically by a known method.

The process procedures, the control procedures, specific names, and data, including various parameters, mentioned in the description and drawings can be changed as required unless otherwise specified.

The constituent elements of the device illustrated are merely conceptual and may not necessarily physically resemble the structures shown in the drawings. For instance, the device need not necessarily have the structure that is illustrated. The device as a whole or in parts can be broken down or integrated either functionally or physically in accordance with the load or how the device is to be used.

According to an embodiment of the present invention, unnatural emphasis of the power of the higher band of the high-frequency component can be prevented, and appropriate encoding of the signal can be realized.

According to an embodiment of the present invention, the signal can be appropriately encoded even if a low frequency resolution is set.

According to an embodiment of the present invention, even if there is a plurality of high-frequency components in one frame, each high-frequency component can be appropriately encoded.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An encoding device that creates first code data by encoding a low-frequency component of a signal by a first encoding method and second code data by encoding a high-frequency component of the signal by a second encoding method, and multiplexes the first code data and the second code data to output a multiplexed code data, the encoding device comprising:

a calculating unit that divides the high-frequency component of the signal to be encoded by the second encoding method into a high-frequency band and a low-frequency band, and calculates a high-frequency power value that indicates a power value of the signal in the high-frequency band, and a low-frequency power value that indicates a power value of the signal in the low-frequency band; and a correcting unit that compares the high-frequency power value and the low-frequency power value, and corrects the power value of the high-frequency component of the signal to be encoded by the second encoding method based on a result of comparison.

2. The encoding device according to claim 1, wherein the calculating unit calculates an average high-frequency power value that indicates an average power value of the signal in the high-frequency band, and an average low-frequency power value that indicates an average power value of the signal in the low-frequency band, and the correcting unit selects the smaller average power value of the average high-frequency power value and the average low-frequency power value, and corrects the power value of the high-frequency component of the signal to be encoded by the second encoding method so that the power value of the high-frequency component equals the selected average power value.

3. The encoding device according to claim 1, wherein the calculating unit calculates an average high-frequency power value that indicates an average power value of the signal in the high-frequency band, and an average low-frequency power value that indicates an average power value of the signal in the low-frequency band, and the correcting unit corrects the power value of the high-frequency component of the signal to be encoded by the second encoding method so that the power value of the high-frequency component equals a power value obtained by attenuating the high-frequency power value by a predetermined percentage.

4. The encoding device according to claim 1, wherein the calculating unit calculates an average low-frequency power value that indicates the average power value of the signal in the low-frequency band, and the correcting unit corrects the power value of the high-frequency component of the signal to be encoded by the second encoding method so that the power value of the high-frequency component equals a power value obtained by amplifying the high-frequency power value by a predetermined percentage.

5. The encoding device according to claim 1, wherein, when there is a plurality of high-frequency components in the signal to be encoded by the second encoding method, the correcting unit corrects the power value of each of the high-frequency components individually based on the result of comparison.

6. An encoding method in an encoding device that creates first code data by encoding a low-frequency component of a signal by a first encoding method and second code data by encoding a high-frequency component of the signal by a second encoding method, and multiplexes the first code data and the second code data to output a multiplexed code data, the encoding method comprising:

dividing the high-frequency component of the signal to be encoded by the second encoding method into a high-frequency band and a low-frequency band;

calculating a high-frequency power value that indicates a power value of the signal in the high-frequency band, and a low-frequency power value that indicates a power value of the signal in the low-frequency band;

comparing the high-frequency power value and the low-frequency power value; and correcting the power value of the high-frequency component of the signal to be encoded by the second encoding method based on a result of comparison.

7. The encoding method according to claim 6, wherein the calculating includes calculating an average high-frequency power value that indicates an average power value of the signal in the high-frequency band, and an average low-frequency power value that indicates an average power value of the signal in the low-frequency band, and the correcting includes selecting the smaller average power value of the average high-frequency power value and the average low-frequency power value, and correcting the power value of the high-frequency component of the signal to be encoded by the second encoding method so that the power value of the high-frequency component equals the selected average power value.

8. The encoding method according to claim 6, wherein the calculating includes calculating an average high-frequency power value that indicates an average power value of the signal in the high-frequency band, and an average low-frequency power value that indicates an average power value of the signal in the low-frequency band, and the correcting includes correcting the power value of the high-frequency component of the signal to be encoded by the second encoding method so that the power value of the high-frequency component equals a power value obtained by attenuating the high-frequency power value by a predetermined percentage.

9. The encoding device according to claim 6, wherein the calculating includes calculating an average low-frequency power value that indicates the average power value of the signal in the low-frequency band, and the correcting includes correcting the power value of the high-frequency component of the signal to be encoded by the second encoding method so that the power value of the high-frequency component equals a power value obtained by amplifying the high-frequency power value by a predetermined percentage.

10. The encoding method according to claim 6, wherein, when there is a plurality of high-frequency components in the signal to be encoded by the second encoding method, the correcting includes correcting the power value of each of the high-frequency components individually based on the result of comparison.

* * * * *